July 12, 1966 E. P. EBBERSTEN 3,260,992
DETERMINING THE POSITION AND QUALITY OF BEDROCK
Filed Dec. 28, 1962
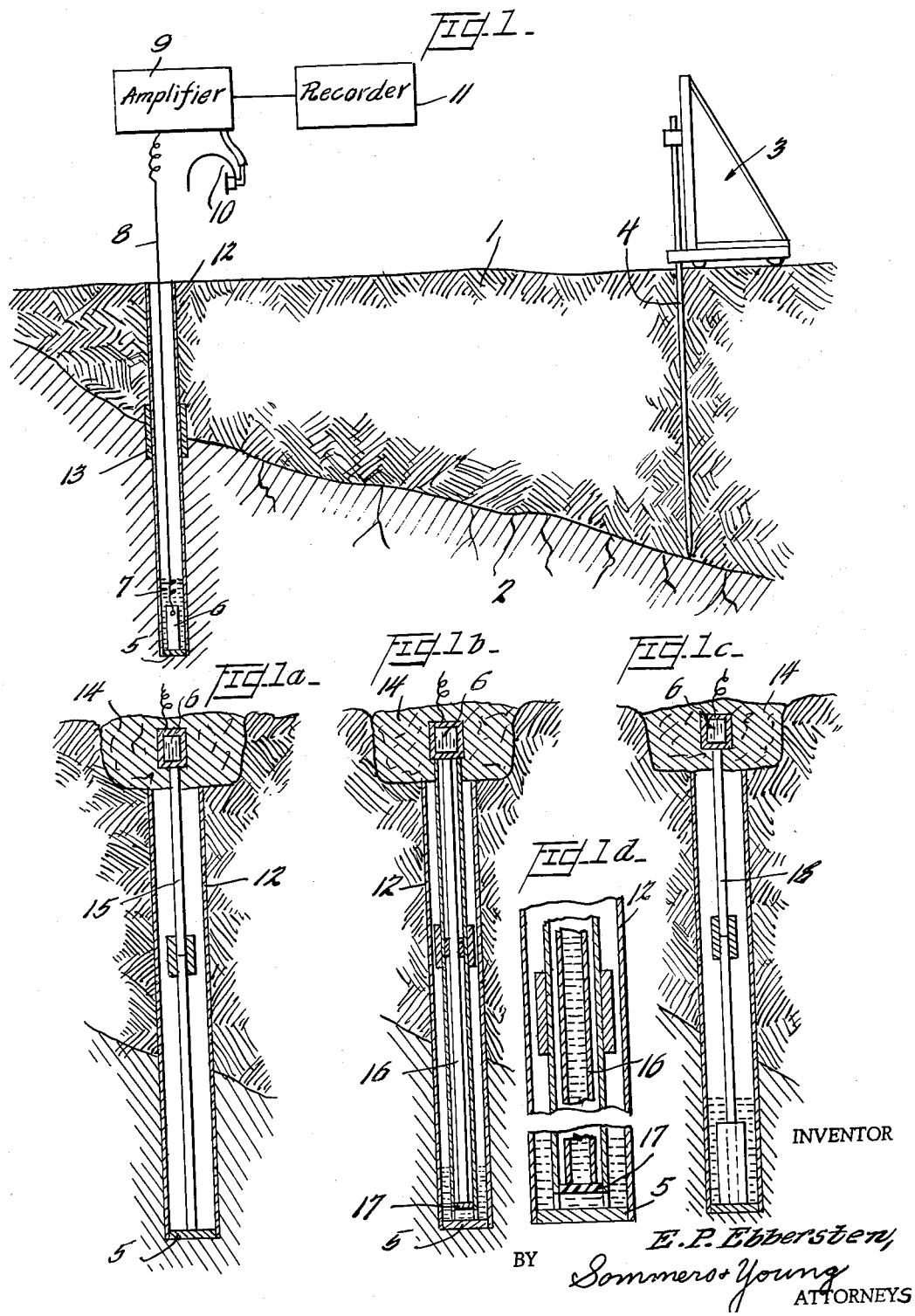
INVENTOR
E. P. Ebbersten
BY Sommers + Young
ATTORNEYS United States Patent Office 3,260,992
Patented July 12, 1966

3,260,992
DETERMINING THE POSITION AND
QUALITY OF BEDROCK
Erik Percy Ebbersten, Drevkarlsstigen 1,
Sollentuna, Sweden
Filed Dec. 28, 1962, Ser. No. 247,985
Claims priority, application Sweden, Jan. 12, 1962,
337/62
6 Claims. (Cl. 340—18)

This invention is concerned with a method for indicating and determining the position of a bedrock surface and/or the quality of bedrock lying under a cover of earth, stones, loose rock fragments or the like. Such indication and determination is of utmost importance e.g. in the building of tunnels and foundations for determining a suitable direction for the tunnel, the pile driving depth required, etc.

According to a known process for such bedrock indication a number of test holes are drilled through the earth layers until rock is encountered. However, in order to make sure that this rock is really solid base bedrock and not just a loose rock fragment it is necessary to continue drilling in each test hole down to a depth of about 3–5 meters inside the rock. Drilling in rock being a rather slow procedure, this method takes much time and is quite expensive.

It is an object of the present invention to overcome these drawbacks and to provide a method permiting indication and determination of the bedrock position and/or bedrock quality with a greater degree of certainty and within a shorter time.

According to the invention, one or more test holes are drilled through the earth layers, the principal characteristic feature of the invention being that the arrival of the drill in the bedrock is observed by guidance of the sound or pressure waves created by said drill working in the bedrock, these waves being picked up and reproduced so as to permit such observation; for this purpose a receiver for sound waves or pressure waves (geophone, hydrophone or similar means) is positioned in direct or sound contact relationship with a reference point in the bedrock and combined with an amplifier and reproduction means, e.g. earphones, loudspeaker and/or a recording instrument. The sound waves generated by the drill when beginning to penetrate into the rock are propagated through the rock and can then be observed acoustically or visually by means of the receiver, amplifier and reproduction means, and by measuring the drilling depth of the test hole at the beginning of this sound perception one is then enabled to determine the position of the rock surface by very simple calculation, as will be readily understood by those skilled in the art. It should be noted that the sound waves created when the drill starts to work in the bedrock are readily perceptible as clearly distinct from any minor sounds reproduced in stages before the drill works in the bedrock.

Suitably, the reference point is positioned in the bedrock inside a reference hole, that is, a borehole drilled to such a depth as to establish full certainty that solid bedrock has been reached, for example to a depth of 3–5 meters, in the above-described manner. If there is solid bedrock above ground or in open cut near the place which is to be investigated the said reference point may be positioned in a hole in this above-ground or open-cut bedrock.

The receiver may be positioned at the reference point or at the ground. In the first case, it is lowered into the reference hole. To ensure good sound transmission from the bedrock to the receiver some water or other suitable liquid may be poured into the hole so as to cover the receiver, or the receiver may be pressed against the bedrock in any convenient manner. In cases where the receiver is placed at the ground surface above the reference hole a good sound contact with the bedrock may be established via a drilling rod or the like or via a tube which is filled with liquid, touches the rock and is in contact with the receiver. In these cases, however, the receiver must be insulated against disturbing noises at or above the ground. Alternatively the receiver, for example, geophone, may be mounted directly on above-ground or open-cut bedrock, with a suitable insulation against disturbing noises.

If additionally the time interval between the emission of a sound impulses from the test hole and the reception of said impulse by the receiver is measured it is possible to obtain some indication of the quality of the bedrock; the distance between the test hole and the reference point being known, and the rate at which sound waves normally propagate in solid rock being known, it is possible to calculate the time that would have elapsed if the rock itself were homogeneous. Thus any deviations from this calculated time value will indicate occurrence of for example, weathered or disintegrated rock, fissures or the like. When such quality indication is desired it is suitable to work with more than one reference point in order to ensure a more certain result. By continuing the drilling of the test hole into the rock and emitting sound impulses at different depths therein it will be possible to obtain furthermore some indications as to the depth of a disintegrated zone, fissure or pocket.

Some preferred embodiments of the invention are illustrated in the attached drawings in which:

FIG. 1 is a schematic view of equipment that may be employed for indicating and determining the position of the bedrock; FIGS. 1a, 1b and 1c illustrate various possibilities of positioning the receiver relatively to the reference point.

FIG. 1d is an enlarged vertical cross section view partially broken away, of the middle and lower portion of the drill hole lining tube and its contents, of FIG. 1b.

Referring to FIG. 1, reference number 1 designates earth layers covering solid bedrock 2, while 3 is a machine driller with which a test hole is drilled down to a depth at which the drilling rod 4 contacts the bedrock. Probing may be used instead of machine drilling, for example, by means of a rammer-actuated steel probe. The reference point is positioned at 5 in the bedrock, and receiver 6 is in this embodiment positioned at the reference point. The receiver is covered with water up to a level 7 to establish a good sound contact with the rock. By a wire line 8 the receiver is connected electrically to an amplifier 9 which in its turn is connected to earphones 10 by means of which a listener will hear when the drilling rod 4 reaches the bedrock 2. Alternatively, the sound waves picked up by the receiver may be recorded continuously by means of a recording instrument 11.

If the earth layers above the rock are so loose that the reference hole is in danger of being filled up by earth sliding into it from above or the sides the hole should be protected by means of a lining tube 12 which extends through the earth layers and if desired may be fixed or sealed on the bedrock as shown at 13.

In FIG. 1a, the receiver 6 is positioned at the ground surface level, under a sound insulation material 14. A drilling rod 15 transmits the sound from reference point 5 to the receiver. In FIG. 1b, the sound is transmitted in a similar manner from reference point 5 through a water-filled tube 16 to the receiver. In the bottom portion of tube 16 an elastic diaphragm 17 is pressed against the rock at reference point 5, so that sound waves will propagate from the rock to the water column in the tube. Alternatively, the borehole may be filled with liquid, for example, up to level 7, the sound waves thus being propagated through the liquid to the diaphragm. In the embodiment of FIG. 1c, the receiver is built in near the bore crown of the drilling rod 18 employed for drilling the reference hole. This drilling rod stays in said reference hole during drilling of the test holes and during the indicating operations, after having been duly sound-insulated (at 14) at the ground level.

It will be appreciated that the present invention is not in any way limited to the preferred embodiments described above but that many modifications may be made, as will be readily understood by those skilled in the art, without transgressing the spirit and scope of the invention. In particular, it will be noted that the arrangement of receiver and contact means as shown in FIG. 2 will be applicable quite as well in cases where only one reference hole is employed, and similarly, that any of the arrangements shown in FIGS. 1, 1a, 1b and 1c will be applicable and useful also when two or more reference holes are employed.

I claim:

1. A method of determining the position of the surface of solid base bedrock underneath layers of earth and stones, comprising the steps of drilling a reference hole into solid base bedrock beneath said layers, placing a receiver for sound waves into sound-contact with the solid base bedrock in the bottom portion of said reference hole, drilling at least one test hole into a solid base bedrock surface beneath said earth and stone layers, thereby transmitting sound waves created by the drill working in the solid base bedrock inside said test hole from said test hole to said solid base bedrock in the bottom portion of said reference hole, and thence to said receiver and from said receiver to above-ground amplifier and reproduction means, indicating in said reproduction means said sound waves created by the drill working in the solid base bedrock, and measuring the depth to which said test hole has been drilled when said sound waves are indicated in said reproduction means.

2. A method according to claim 1, comprising the step of placing said receiver in direct contact with the bedrock in the bottom portion of said reference hole to thus establish said sound contact.

3. A method according to claim 1, comprising the steps of installing said receiver at the ground surface, insulating it against disturbing sounds encountered at and above the ground surface, and connecting it to a tube extending into said reference hole and down to its bottom, to thus establish said sound contact.

4. A method according to claim 1, comprising the steps of installing said receiver at the ground surface, insulating it against disturbing sounds encountered at and above the ground surface, connecting it to a hollow tube extending into said reference hole, and pouring liquid into said hollow tube to establish liquid contact between said tube and the bottom of said reference hole and to thus establish said sound contact.

5. A method according to claim 1, comprising the steps of mounting said receiver in a hollow tube, introducing said receiver with said tube into said reference hole, insulating the upper end of said tube near the ground surface against disturbing sounds encountered at and above the ground surface, and pouring liquid into said reference hole around said tube so as to surround at least the bottom portion of said tube, to thus establish said sound contact.

6. A method according to claim 1, comprising the steps of lowering said receiver into said reference hole and pouring a liquid into said reference hole so as to cover said receiver, to thus establish said sound contact.

References Cited by the Examiner

UNITED STATES PATENTS

| | | | |
|---|---|---|---|
| 478,791 | 7/1892 | Gardner | 181—.5 |
| 2,330,753 | 9/1943 | Sikes | 340—18 |
| 2,425,868 | 8/1947 | Dillon | 181—.5 |
| 2,436,047 | 2/1948 | Martin | 340—18 |
| 2,947,377 | 8/1960 | Peterson | 181—.5 |

BENJAMIN A. BORCHELT, *Primary Examiner.*

CHESTER L. JUSTUS, *Examiner.*

R. M. SKOLNIK, W. KUJAWA, *Assistant Examiners.*